United States Patent [19]

Hildebrandt et al.

[11] Patent Number: 5,356,179
[45] Date of Patent: Oct. 18, 1994

[54] ENERGY ABSORBING DEVICE FOR A STEERING COLUMN

[75] Inventors: Thomas J. Hildebrandt, Troy; Tim J. Wehner, Auburn Hills, both of Mich.

[73] Assignee: Chrysler Corporation, Highland Park, Mich.

[21] Appl. No.: 119,632

[22] Filed: Sep. 13, 1993

[51] Int. Cl.⁵ .............................................. B62D 1/11
[52] U.S. Cl. ...................................... 280/777; 74/492
[58] Field of Search .................... 280/777 B, 775, 780; 74/492, 493

[56] References Cited

U.S. PATENT DOCUMENTS

| | | | |
|---|---|---|---|
| 4,228,695 | 10/1980 | Trevisson et al. | 74/492 |
| 4,915,412 | 4/1990 | Yuzuriha et al. | 280/777 X |
| 4,951,522 | 8/1990 | Chowdhury et al. | 74/492 |
| 5,024,118 | 6/1991 | Khalifa et al. | 280/777 X |
| 5,052,715 | 10/1991 | Ervin et al. | 280/777 |
| 5,082,311 | 1/1992 | Melotik | 280/777 |
| 5,230,533 | 7/1993 | Yamaguchi | 280/777 X |

*Primary Examiner*—Brian L. Johnson
*Assistant Examiner*—Christopher P. Ellis
*Attorney, Agent, or Firm*—Edward A. Craig

[57] ABSTRACT

An energy absorbing device for the steering column of a vehicle comprising a pair of U-shaped energy absorbing straps made of relatively stiff, bendable, flexible strip material. One leg of each strap is connected to fixed vehicle support structure. The other leg is connected to the steering column. If the steering column collapses as in a collision when the driver is thrown forward against the steering wheel, one leg of each strap will move with the steering column, resisting movement thereof and absorbing energy gradually to prevent excessive reaction forces of the steering wheel against the driver.

2 Claims, 3 Drawing Sheets

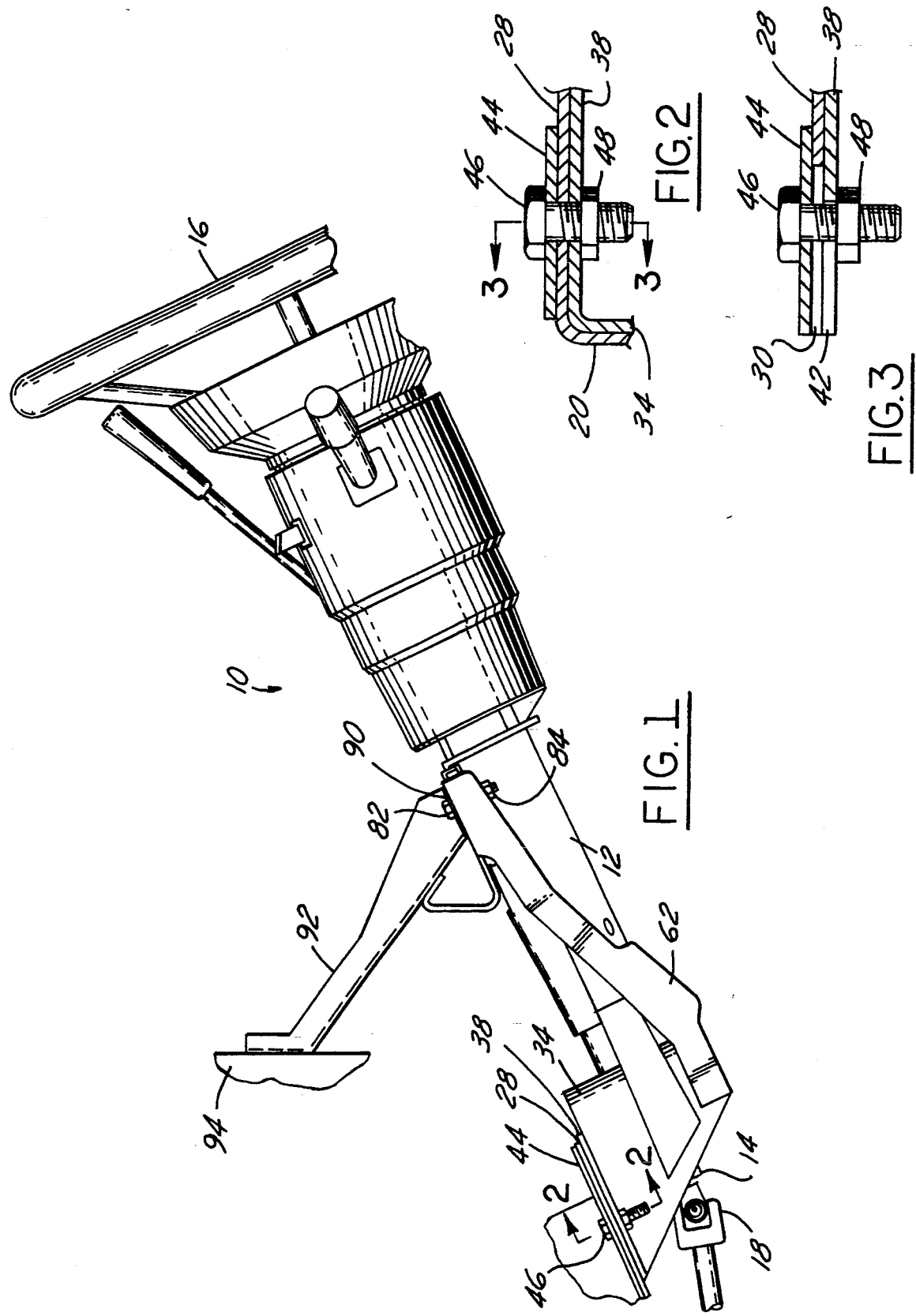

ENERGY ABSORBING DEVICE FOR A STEERING COLUMN

This invention relates generally to energy absorbing devices and refers more particularly to an energy absorbing device for the steering column of an automotive vehicle.

BACKGROUND AND SUMMARY

When a crash or collision occurs the driver is often thrown forward against the steering wheel with great impact. The result can be serious injury or even death.

One of the objects of this invention is to provide an energy absorbing device for the steering column which allows it to collapse upon impact but with a controlled resistance to movement, gradually absorbing energy to prevent excessive reaction forces against the driver.

More specifically, the energy absorbing device comprises a plurality of generally U-shaped straps made of a relatively stiff, bendable, flexible strip material. One leg of each strap is connected to the steering column. The other leg is anchored to vehicle support structure. When the steering column collapses as in a head-on collision, the straps resist movement and absorb energy gradually, providing a controlled reaction force against the driver.

The energy absorbing device also resists tilting of the steering column as it collapses. The force of impact of the driver against the steering column sometimes tends to tilt it upwardly, and such force is resisted preferably by struts on opposites of the steering column.

Another object of the invention is to provide an energy absorbing device for a steering column which is rugged and durable, composed of a relatively few simple parts, can be easily and inexpensively manufactured, and is highly effective in controlling the collapse of the steering column and the reaction forces against the driver when the driver is thrown forward against the steering column in a collision.

Other objects, features and advantages will become more apparent as the following description proceeds, especially when considered with the accompanying drawings.

BRIEF DESCRIPTION OF THE DRAWINGS

FIG. 1 is a side elevational view of an energy absorbing device for the steering column of an automobile, constructed in accordance with the invention.

FIG. 2 is a fragmentary sectional view taken on the line 2—2 in FIG. 1.

FIG. 3 is a fragmentary sectional view taken on the line 3—3 in FIG. 2.

DETAILED DESCRIPTION

Figure 4:
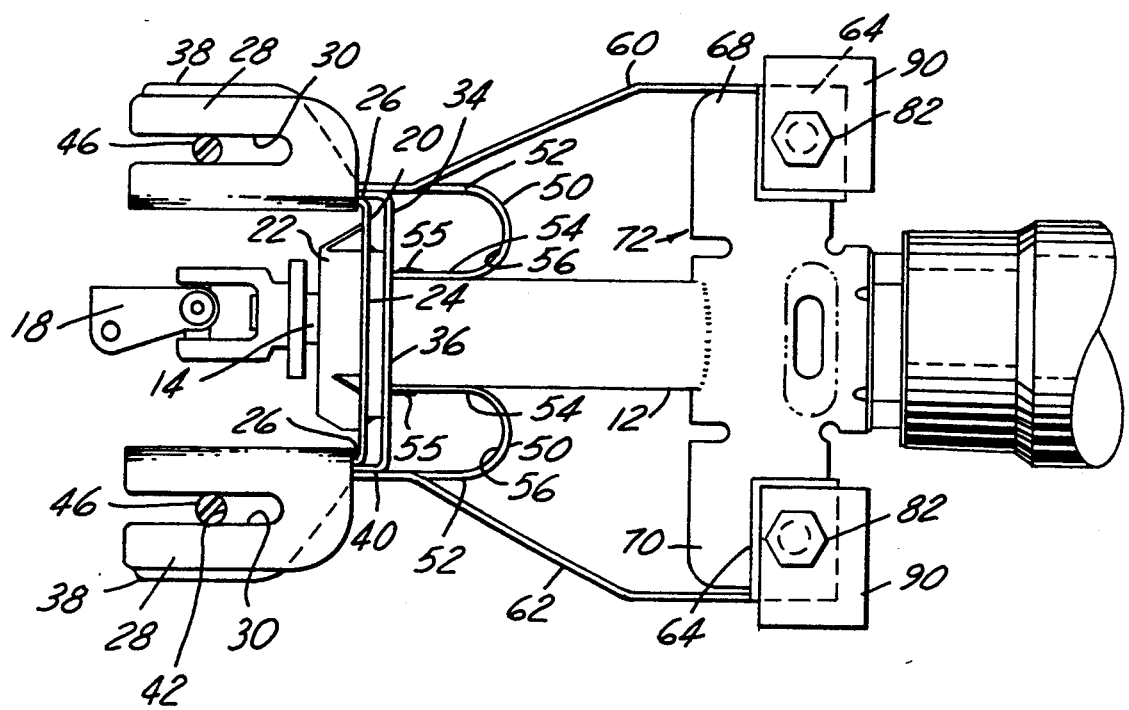
FIG. 4 is a top plan view of the device shown in FIG. 1, in the normal position, with parts broken away and in section.

Referring now more particularly to the drawings, a steering column assembly 10 has a tubular steering column 12. A steering shaft 14 extends through the tubular steering column 12 and is connected to the steering wheel 16 at the upper end and to a shaft coupler 18 at the lower end. The shaft coupler is operatively connected to a steering gear assembly (not shown) to steer the front wheels of an automotive vehicle.

The lower end of the steering column 12 is connected to a generally U-shaped bracket plate 20 by a coupling 22. The steering column 12 extends through a hole in the base 24 of the bracket plate 20 and the coupling 22 firmly secures the steering column 12 to the base 24. The side walls 26 of the bracket plate are disposed on opposite sides of the steering column and have laterally outwardly extending flanges 28. Each flange has a longitudinally extending slot 30 which is open at the front end, that is, the end away from the steering wheel. When column 12 collapses, as it may during a frontal collision, the coupling 22 detaches from bracket plate 20 and will continue to traverse axially with column 12.

Surrounding the U-shaped bracket plate 20 is a second U-shaped bracket plate 34. The steering column 12 extends through a hole in the base 36 of the bracket plate 34. The side walls 40 of the bracket plate 34 are disposed along the outer sides of the side walls 26 of bracket plate 20 and have laterally outwardly extending flanges 38. The flanges 38 underlie the flanges 28 of bracket plate 20. Flanges 38 also have longitudinal slots 42 which register with slots 30. Slots 42 are shorter than slots 30 and are open at the ends away from the steering wheel.

A fixed support bracket 44 (FIGS. 1-3) is anchored to vehicle support structure (not shown). Bolts 46 from the support bracket 44 extend through the registering slots 30 and 42 in flanges 28 and 38. Nuts 48 threaded on the ends of bolts 46 clamp the flanges 28 and 38 together. The bolts 46 bottom in the relatively short slots 42, so that the bracket plate 34 is positively and rigidly held against forward movement relative to the fixed bracket 44 in the direction of steering column collapse. The bolts 46 and nuts 48 frictionally clamp the bracket plates 20 and 34 together in the FIG. 4 position.

Figure 5:
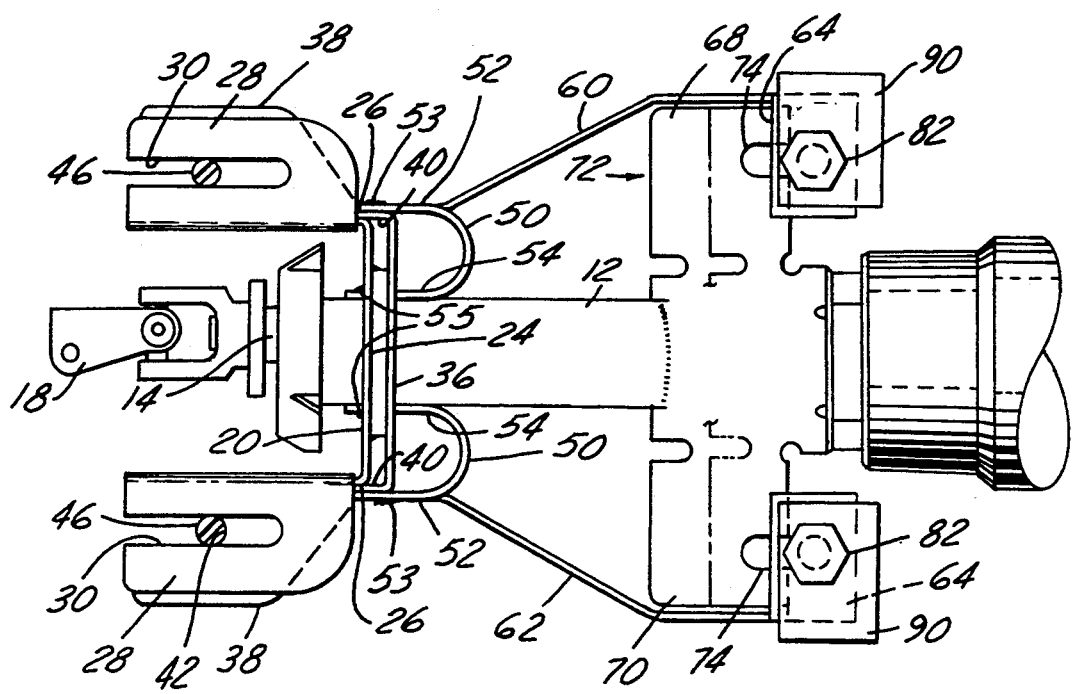
FIG. 5 is a top plan view similar to FIG. 4, but showing the steering column collapsed after a head-on collision.
Figure 6:
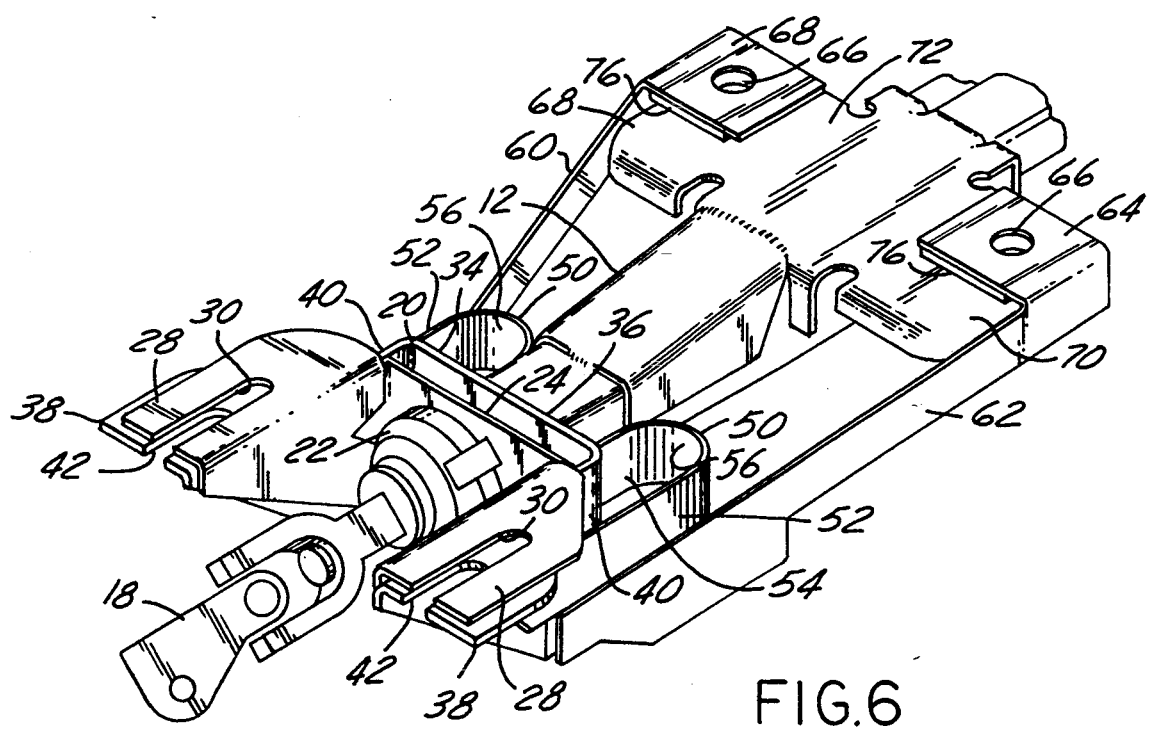
FIG. 6 is a perspective view of the device.
Figure 7:
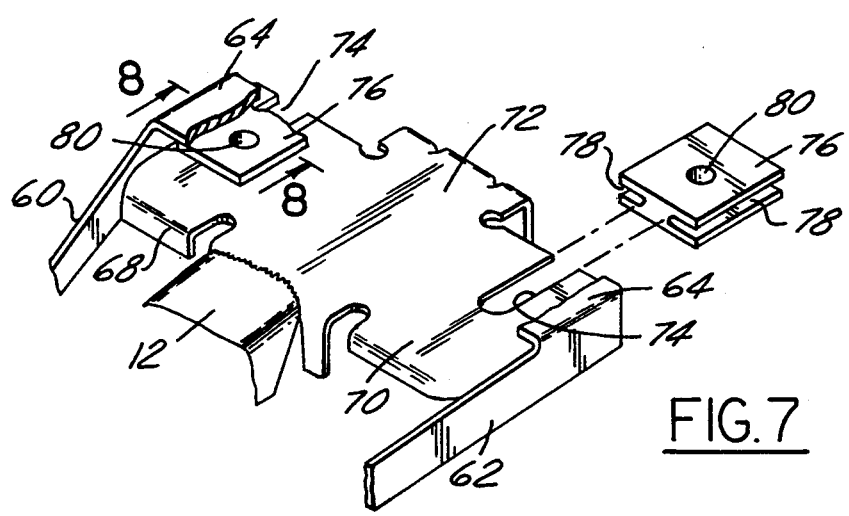
FIG. 7 is a fragmentary perspective view of the device, partially exploded and with parts broken away.
Figure 8:
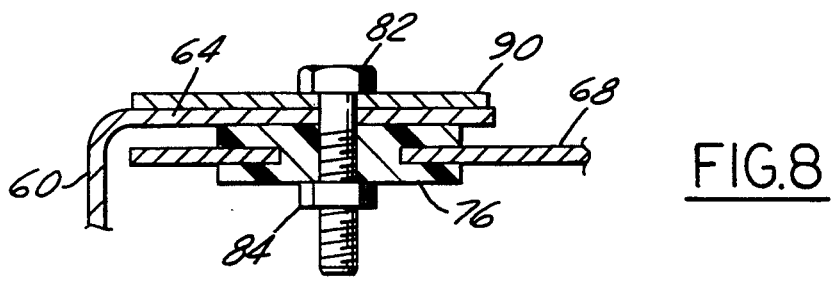
FIG. 8 is a fragmentary sectional view taken on the line 8—8 in FIG. 7.

A pair of energy absorbing straps 50 are provided. These straps are made of relative stiff, bendable, flexible strip material. Each strap is generally U-shaped, having spaced legs 52 and 54 connected by a byte portion 56. One leg 52 of each strap is permanently secured at 53 in surface-to-surface relation as by welding to a side wall 40 of the bracket plate 34. The other leg 54 is rigidly secured at 55 in surface-to-surface relation as by welding to the steering column 12. The legs of the brackets extend lengthwise of the column in a forward direction away from the byte portion and away from the steering wheel. When the steering column collapses, as it may in a head-on collision, and the driver is thrown forwardly against the steering wheel, one leg 54 of each strap will move with the steering column. However, the other leg 52 will remain fixed so that there is a rolling action of the straps and a gradual absorption of energy, preventing excessive reaction forces of the steering column against the driver. (See FIG. 5). The connections 53 and 55 of the legs 52 and 54 to the bracket plate 34 and steering column 12 are spaced from the byte portion sufficiently to permit this rolling action. The resistance to axial movement of the steering column by the straps 50 can be varied by changing the thickness, dimensions, and material properties of the straps.

In a head-on collision, the impact of the driver against the steering wheel creates forces which often tilt the steering wheel upwardly about a horizontal axis perpendicular to the steering column. Such forces are resisted and countered by the elongated struts 60 and 62 on opposite sides of the steering column. The front ends of struts 60 and 62 are rigidly connected as by welding to the outer side walls 40 of fixed bracket plate 34. The rear ends of struts 60 and 62 terminate in laterally inwardly extending flanges 64. These flanges 64 have holes 66 and overlie the end portions 68 and 70 of a cross member 72 rigidly secured to and extending perpendicular to the steering column 12. The end portions 68 and 70 have elongated, longitudinal slots 74 which register with the holes 66 in flanges 64. A slide 76 is provided for each of the end portions 68, 70. Each slide has side slots 78 which slidably engage the sides of a slot 74, and also has a center hole 80 which registers with slot 74. A bolt 82 extends through the hole 66 in each flange 64, through the hole 80 in one of the slides 76 and through the registering slot 74 in one of the end portions 68, 70, and is secured by a nut 84. Bolts 82 also extend through holes in flanges 90 of bracket arm 92. Bracket arm 92 is secured to vehicle support structure 94. Therefore, the flanges 64 of struts 60 and 62 are rigidly anchored to the vehicle support structure.

When the steering column collapses, the slides 76 slide in slots 74 to permit collapse. However, the struts 60, 62 prevent vertical tilting of the steering column.

What is claimed is:

1. An energy absorbing device for the steering column of a vehicle having a steering wheel at one end thereof, comprising a bracket adapted to be secured to a vehicle support structure and disposed adjacent to the steering column, said bracket being generally channel-shaped having a base extending perpendicular to the steering column and laterally spaced first and second side walls, a hole in said base through which the steering column extends, said side walls being disposed on opposite sides of the steering column, first and second energy absorbing straps on opposite sides of the steering column, said straps being made of relatively stiff, bendable, flexible strip material, said straps being generally U-shaped having spaced legs connected by a curved byte portion and oriented with the byte portions thereof adjacent the steering wheel and said legs extending from said byte portions in a forward direction away from the steering wheel lengthwise of the steering column, one leg of said first strap being rigidly connected to the first wall of said bracket at a point spaced from the byte portion thereof and otherwise free of connection thereto, one leg of said second strap being rigidly connected to the second side wall of said bracket at a point spaced from the byte portion thereof and otherwise free of connection thereto, the other legs of said straps extending alongside and being rigidly connected directly to the opposite sides, respectively, of the steering column and otherwise free of connection thereto, whereby upon collapse of the steering column as in a collision, said other leg of each strap will move with the steering column and said straps will move along the surface of the steering column with a rolling action to absorb energy gradually and prevent excessive reaction forces of the steering column against the driver.

2. An energy absorbing device as defined in claim 1, and further including means for resisting tilting of the steering column about an axis transverse thereto, comprising a pair of elongated struts on opposite sides of the steering column and extending generally lengthwise of the steering column, a cross member rigidly secured to and extending transversely of the steering column, said struts having front ends rigidly connected to the respective side walls of the said bracket, said struts having rear ends, and means providing a sliding connection between said cross member and the rear ends of said struts.

* * * * *